2,768,159
MONOAZO DYESTUFFS

Werner Bossard, Riehen near Basel, and Otto Bitterlin, Basel, Switzerland, assignors to J. R. Geigy A. G., Basel, Switzerland, a Swiss firm No Drawing. Application October 5, 1953, Serial No. 384,316

Claims priority, application Switzerland October 17, 1952

9 Claims. (Cl. 260—199)

The present invention concerns the production of new monoazo dyestuffs having affinity to cellulose fibers which can be diazotised and developed on the fibre. It also concerns the production of white dischargeable cellulose dyeings with wet fastness properties by diazotising the monoazo dyestuffs according to the invention on the fibre and developing with coupling components containing no sulphonic acid groups.

The main application for substantive cellulose dyestuffs which can be diazotised and developed with coupling components containing no sulphonic acid groups on the fibre is for discharge articles. Discharge printing requires dyeings which not only can be discharged pure white with the usual discharge pastes containing formaldehyde sulphoxylate but have also such wet fastness properties that on washing out the reduction products from the discharged places, no bleeding occurs.

It has now been found that monoazo dyestuffs which have excellent affinity to cellulose and which can be diazotised and developed on the fibre, the developed cellulose dyeings of which have excellent wet fastness properties and can be discharged pure white, can be obtained if diazo compounds of amines of the general Formula I are coupled with a 2-(3'- or 4'-aminobenzoylamino)-5-hydroxynaphthalene-7-sulphonic acid or a 2-[3'- or 4'-(3''- or 4''- aminobenzoylamino) - benzoylamino] - 5-hydroxynaphthalene-7-sulphonic acid or with derivatives thereof having azol rings, i. e. derivatives the =N—C— bridging members of which are members of an azol ring between the benzene and naphthalene nucleus.

In this formula

X represents hydrogen, chlorine, a methyl, methoxy or a sulphonic acid group,
Y represents hydrogen or a methyl group and
n represents a number of the value of 0 or 1.

The benzene ring of the aminobenzoyl group of the azo component can be further substituted, preferably non-ionogenically, e. g. by halogen, alkyl or alkoxy groups. Those azol derivatives of 2-acylamino-5-hydroxynaphthalene-7-sulphonic acids can be used which with the inclusion of a sulphur atom or an imide group contain an annulated azole ring in the 1.2-positions of the naphthalene nucleus, e. g. the 2-(4''- or 3''-aminophenyl)-naphtho-1''.2':4.5-thiazol-5'-hydroxy-7'-sulphonic acids or the 2-(4''- or 3''- aminophenyl) - naphtho - 1'.2':4.5-imidazol-5'-hydroxy-7'-sulphonic acids or the 2-[4''- or 3''- (4'''- or 3''' - aminobenzoylamino) - phenyl]-naphtho - 1'.2:4.5' - thiazol - 5' - hydroxy - 7' - sulphonic acids or the 2-[4''- or 3''-(4'''- or 3'''-aminobenzoylamino) - phenyl] - naphtho - 1' - 2':4.5 - imidazol-5' - hydroxy - 7' - sulphonic acids, and, in this connection, any benzene radicals present in the azol compound can be substituted as described above for the benzoyl radical.

Diazo components which can be used according to the invention can be obtained from 5-amino-2-hydroxybenzene-1-carboxylic acids which if desired can be substituted in the 3-position as defined by reacting them with p-nitrobenzoyl chloride or p-nitrophenyl isocyanate, reducing the nitro to the amino group, again reacting with p-nitrobenzoyl chloride or p-nitrophenyl isocyanate and reducing the nitro group to the amino group. If desired, these acylating agents can contain methyl groups in the ortho or meta positions to the nitro group. Diazotisation is performed in the usual way with sodium nitrite in a mineral acid solution or suspension in the cold and the coupling is performed in an alkaline to weakly acid medium. For example 2-(4'-aminobenzoylamino- or 3'-aminobenzoylamino- or 4'-methyl - 3' - aminobenzoylamino- or 4'-methoxy-3'-aminobenzoylamino- or 3'-methyl-4'-aminobenzoylamino- or 4'-chloro-3'-aminobenzoylamino) - 5 - hydroxynaphthalene - 7- sulphonic acids or 2 - [4' - (4''-aminobenzoylamino) - benzoylamino] - 5 - hydroxynaphthalene - 7 sulphonic acid or 2 - [3'' - (4'' - aminobenzoylamino) - benzoylamino] - 5-hydroxynaphthalene - 7 - sulphonic acid or 2 - [4'-(4'' - amino - 3'' - methyl - benzoylamino) - benzoylamino] - 5 - hydroxynaphthalene - 7 - sulphonic acid or 2 - [3' - (4'' - aminobenzoylamino) - 4'' - methyl-

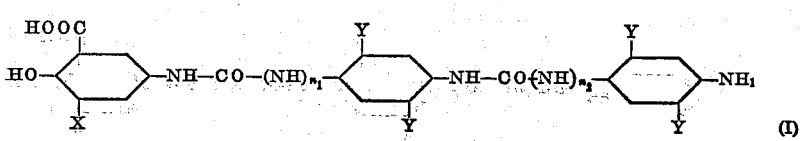

benzoylamino] - 5 - hydroxynaphthalene - 7 - sulphonic acid or 2 - [4' - (3'' - amino - 4'' - methyl - benzoylamino) - benzoylamino] - 5 - hydroxynaphthalene - 7-sulphonic acid or the derivatives thereof containing an azol ring mentioned above can be used as coupling components.

The monoazo dyestuffs according to the present invention are distinguished from similar previously known dyestuffs by their excellent affinity to cellulose and by the very good wet fastness of their cellulose dyeings. The dyestuffs with carboxylic acid amide linkages, i. e. those in which $n=0$, produce particularly pure shades and are, therefore, to be preferred. Due to the good fastness to light and the excellent wet fastness properties on cellulose, the new monoazo dyestuffs can be used as direct cellulose dyestuffs without any after treatment whatever. However, the dyeings obtained by diazotising on the fibre and developing with coupling components not containing any sulphonic acid groups are particularly valuable. The direct cellulose dyeings are diazotised in the usual way by reacting with nitrous acid in a cold mineral acid solution and developing in an alkaline solution. Unsulphonated enolic or phenolic azo components are suitable as a developer. It is advantageous however, to use naphthols coupling in the o-position to the hydroxyl group, in particular 2-naphthol.

In the form of their alkali salts the new monoazo dyestuffs are yellow-red to brown-red powders according to the composition. They dissolve in water with a red and in concentrated sulphuric acid with a blue-red colour.

The following examples illustrate the invention without limiting it in any way. Where not otherwise stated, parts are given as parts by weight and the temperatures are in degrees centigrade. The relationship of parts by weight to parts by volume is as that of kilogrammes to litres.

Example 1

The sodium salt of 39.1 parts of 5-[4'-(4''-aminobenzoylamino) - benzoylamino] - 2 - hydroxybenzene-1-carboxylic acid, produced from 4'-aminobenzoyl-5-amino-2-hydroxybenzene-1-carboxylic acid by condensing with 4-nitrobenzoyl chloride and reducing with sodium sulphide, is suspended in 600 parts of water at room temperature. 5.5 parts of caustic soda and 7.6 parts of sodium nitrite are added and the whole is added dropwise to a mixture of 68 parts of concentrated hydrochloric acid and 68 parts of water. On completion of the diazotisation, the diazonium compound is coupled at 20–25° with an aqueous solution of 35.8 parts of 2-(4'-amino-benzoylamino)-5-hydroxynaphthalene-7-sulphonic acid in the presence of 15 parts of sodium bicarbonate. The next day, the monoazo dyestuff is precipitated by the addition at 70° of 280 parts of sodium chloride and 9.6 parts of caustic soda. It is filtered off and dried. The dyestuff of the formula:

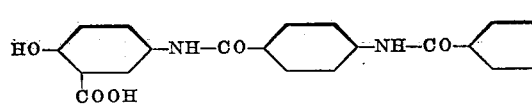
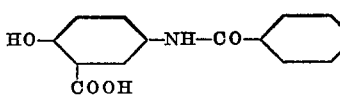

is a red powder which dissolves in water with a yellowish red and in concentrated sulphuric acid with a blue-red shade. The dyestuff dyes cellulose fibres in pure yellowish-red shades and, diazotised on the fibre and developed with 2-hydroxynaphthalene, produces pure scarlet dyeings which have excellent fastness to water and can be discharged pure white.

If in the above example, instead of 35.8 parts of 2-(4'-aminobenzoylamino) - 5-hydroxynaphthalene-7-sulphonic acid the number of parts of the coupling components given in the following table are used, dyestuffs are obtained with the following properties:

| Dyestuff No. | No. of parts by weight | Coupling component coupled with the diazo component from 39.1 parts of 5-[4'-(4''-aminobenzoylamino)-benzoylamino]-2-hydroxybenzene-1-carboxylic acid | Dyestuff properties: P=colour of powder; S= Shade of diazotised dyeing developed with β-naphthol |
|---|---|---|---|
| 1 | 37.2 | 2-(3'-methyl-4'-aminobenzoylamino)-5-hydroxynaphthalene-7-sulphonic acid. | P, brown-red; S, brilliant red. |
| 2 | 35.8 | 2-(3'-aminobenzoylamino)-5-hydroxynaphthalene-7-sulphonic acid. | P, red; S, orange-red. |
| 3 | 37.2 | 2-(4'-methyl-3'-aminobenzoylamino)-5-hydroxynaphthalene-7-sulphonic acid. | Do. |
| 4 | 39.25 | 2-(4'-chloro-3'-aminobenzoylamino)-5-hydroxynaphthalene-7-sulphonic acid. | P, red; S, yellowish-red. |
| 5 | 35.5 | 2-(4''-aminophenyl)-naphtho-1',2':4,5-imidazol-5'-hydroxy-7'-sulphonic acid. | P, red-brown; S, red. |
| 6 | 35.5 | 2-(3''-aminophenyl)-naphtho-1',2':4,5-imidazol-5'-hydroxy-7'-sulphonic acid. | Do. |
| 7 | 37.2 | 2-(4''-aminophenyl)-naphtho-1',2':4,5-thiazol-5'-hydroxy-7'-sulphonic acid. | Do. |
| 8 | 37.2 | 2-(3''-aminophenyl)-naphtho-1',2':4,5-thiazol-5'-hydroxy-7'-sulphonic acid. | Do. |
| 9 | 47.7 | 2-[4'-(4''-aminobenzoylamino)-benzoylamino]-5-hydroxynaphthalene-7-sulphonic acid. | P, red; S, yellowish red. |
| 10 | 47.7 | 2-[3'-(4''-aminobenzoylamino)-benzoylamino]-5-hydroxynaphthalene-7-sulphonic acid. | Do. |
| 11 | 49.1 | 2-[4'-(4''-amino-3''-methylbenzoylamino)-benzoylamino]-5-hydroxynaphthalene-7-sulphonic acid. | P, brown-red; S, clear yellowish-red. |
| 12 | 49.1 | 2-[3'-(4''-aminobenzoylamino)-4'-methylbenzoylamino]-5-hydroxynaphthalene-7-sulphonic acid. | P, brown-red; S, yellowish red. |
| 13 | 49.1 | 2-[4'-(3''-amino-4''-methylbenzoylamino) - benzoylamino] - 5-hydroxynaphthalene-7-sulphonic acid. | P, red; S, yellowish red. |
| 14 | 47.4 | 2-[4''-(4'''- or 3'''-aminobenzoylamino)-phenyl]-naphtho-1',2':4,5-imidazol-5'-hydroxy-7'-sulphonic acid. | P, red brown; S, red. |
| 15 | 47.4 | 2-[3''-(4'''- or 3'''-aminobenzoylamino)-phenyl]-naphtho-1',2':4,5-imidazol-5'-hydroxy-7'-sulphonic acid. | P, brown red; S, red. |
| 16 | 49.1 | 2-[4''-(4'''- or 3'''-aminobenzoylamino)-phenyl]-naphtho-1',2':4,5-thiazol-5'-hydroxy-7'-sulphonic acid. | P, red brown; S, red. |
| 17 | 49.1 | 2-[3''-(4'''- or 3'''-aminobenzoylamino)-phenyl]-naphtho-1',2':4,5-thiazol-5'-hydroxy-7'-sulphonic acid. | P, brown red; S, red. |

Example 2

The sodium salt of 40.5 parts of 5-[4'-(3''-methyl-4''-aminobenzoylamino)-benzoylamino] - 2-hydroxybenzene-1-carboxylic acid is suspended at 20° in 600 parts of water and 5.5 parts of caustic soda and, after the addition of 7.6 parts of sodium nitrite, the whole is added to 68 parts of hydrochloric acid 30% and 68 parts of water. The diazonium compound is stirred for some hours at 20° and coupled with an aqueous solution of 35.8 parts of 2-(4'-aminobenzoylamino)-5-hydroxynaphthalene - 7 - sulphonic acid and 15 parts of sodium bicarbonate in 720 parts of water. After a few hours, the monoazo dyestuff of the formula:

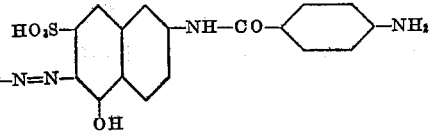
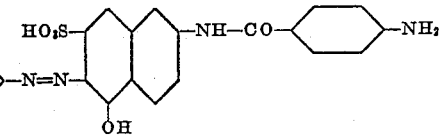

can be precipitated at 90° with 280 parts of sodium chloride and 9.6 parts of caustic soda. The filtered and dried dyestuff is a red powder which dissolves in water with a yellowish-red and in concentrated sulphuric acid with a blue-red colour. Cellulose fibres are dyed in yellowish-red shades. If the dyestuff is diazotised on the fibre and coupled with 2-hydroxynaphthalene, pure scarlet dyeings are obtained which have excellent water fastness and which can be discharged pure white.

If in the above example, instead of 40.5 parts of 5-[4'-(3''-methyl-4''-aminobenzoylamino) - benzoylamino] - 2-hydroxybenzene-1-carboxylic acid, the number of parts by weight of an amino compound given in the following table are used for the diazotisation, dyestuffs with the following properties are obtained:

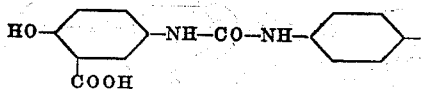

| Dyestuff No. | No. of parts by weight | 35.8 parts of 2-(4'-aminobenzoylamino)-5-hydroxynaphthalene-7-sulphonic acid coupled with diazocomponents from— | Dyestuff properties: P=Colour of powder; S= Shade of diazotised dyeing developed with β-naphthol |
|---|---|---|---|
| 1 | 41.9 | 5-[4'-(3''-methyl-4''-aminobenzoylamino)-3'-methylbenzoylamino]-2-hydroxybenzene-1-carboxylic acid. | P, red; S, brilliant red. |
| 2 | 48.5 | 5-[4'-(3''-methyl-4''-aminobenzoylamino)-benzoylamino]-3-sulpho-2-hydroxybenzene-1-carboxylic acid. | P, brown red; S, red. |
| 3 | 40.5 | 5-[4'-(4''-aminobenzoylamino)-3'-methylbenzoylamino]-2-hydroxybenzene-1-carboxylic acid. | P, red; S, pure scarlet. |
| 4 | 40.5 | 5-[4'-(4''-aminobenzoylamino)-benzoylamino]-3-methyl-2-hydroxybenzene-1-carboxylic acid. | P, brown red; S, pure red. |
| 5 | 41.9 | 5-[4'-(2'', 5''-dimethyl-4''-aminobenzoylamino)-benzoylamino]-2-hydroxybenzene-1-carboxylic acid. | P, red; S, red. |
| 6 | 40.5 | 5-[4'-(2''-methyl-4''-aminobenzoylamino)-benzoylamino]-2-hydroxybenzene-1-carboxylic acid. | P, red; S, scarlet. |
| 7 | 40.5 | 5-[4'-(4''-aminobenzoylamino)-2'-methylbenzoylamino]-2-hydroxybenzene-1-carboxylic acid. | Do. |
| 8 | 42.55 | 5-[4'-(4''-aminobenzoylamino)-benzoylamino]-3-chloro-2-hydroxybenzene-1-carboxylic acid. | P, red brown; S, red. |
| 9 | 42.1 | 5-[4'-(4''-aminobenzoylamino)-benzoylamino]-3-methoxy-2-hydroxybenzene-1-carboxylic acid. | P, brown red; S, red. |
| 10 | 47.1 | 5-[4'-(4''-aminobenzoylamino)-benzoylamino]-3-sulpho-2-hydroxybenzene-1-carboxylic acid. | P, red; S, red. |

Further dyestuffs are given in the following table:

| Dyestuff No. | No. of parts by weight | Coupling components coupled with the diazo component from 40.5 parts of 5-[4'-(3''-methyl-4''-aminobenzoylamino)-benzoylamino]-2-hydroxybenzene-1-carboxylic acid | Dyestuff properties: P=colour of powder; S= Shade of dyeing developed with β-naphthol |
|---|---|---|---|
| 1 | 35.8 | 2-(3'-aminobenzoylamino)-5-hydroxynaphthalene-7-sulphonic acid. | P, red; S, yellowish red. |
| 2 | 37.2 | 2-(3'-methyl-4'-aminobenzoylamino)-5-hydroxynaphthalene-7-sulphonic acid. | P, brown-red; S, brilliant red. |
| 3 | 37.2 | 2-(4'-methyl-3'-aminobenzoylamino)-5-hydroxynaphthalene-7-sulphonic acid. | P, red; S, scarlet. |
| 4 | 39.25 | 2-(4'-chloro-3'-aminobenzoylamino)-5-hydroxynaphthalene-7-sulphonic acid. | P, red-brown; S, red. |
| 5 | 35.5 | 2-(3'-aminophenyl)-naphtho-1'.2':4.5-imidazo-5'-hydroxy-7'-sulphonic acid. | Do. |
| 6 | 47.7 | 2-[4'-(4''-aminobenzoylamino)-benzoylamino]-5-hydroxynaphthalene-7-sulphonic acid. | P, red; S, brilliant red. |

Example 3

After adding 5.5 parts of caustic soda and 7.6 parts of sodium nitrite to the sodium salt of 40.6 parts of 4'-(4''-aminobenzoylamino)-3-carboxy-4-hydroxydiphenyl urea in 600 parts of water, the suspension is added dropwise at 20° to 68 parts of hydrochloric acid 30% and 68 parts of water. The diazonium compound which is obtained after some hours is coupled at 0–5° with 35.8 parts of 2-(4'-aminobenzoylamino)-5-hydroxynaphthalene-7-sulphonic acid in the presence of 15 parts of sodium bicarbonate. On completion of the coupling, the monoazo dyestuff of the formula:

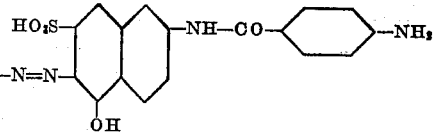

is precipitated at 70° with 300 parts of sodium chloride and 9.6 parts of caustic soda. The dyestuff, when filtered off and dried, is a red powder. It dissolves in water with a yellowish-red and in concentrated sulphuric acid with a blue-red colour. Cellulose fibers are dyed in red shades. Diazotised on the fibre and coupled with 2-hydroxynaphthalene it produces red dyeings of excellent water fastness which can be discharged pure white.

If in the above example, instead of 40.6 parts of 4'-(4'' - aminobenzoylamino)-3-carboxy-4-hydroxydiphenyl urea, the number of parts by weight of the amino compound given in the following table are used for the diazotisation, dyestuffs with the following properties are obtained:

| Dyestuff No. | No. of parts by weight | 35.8 parts of 2-(4'-aminobenzoylamino)-5-hydroxynaphthalene-7-sulphonic acid coupled with diazocomponents from— | Dyestuff properties: P=Colour of powder; S= Shade of diazotised dyeing developed with β-naphthol |
|---|---|---|---|
| 1 | 42.1 | 4'-(4''-aminophenylureido)-3-carboxy-4-hydroxydiphenyl urea. | P, red-brown; S, bordeaux red. |
| 2 | 40.6 | 5-[4'-(4''-aminophenylureido)-benzoyl-amino]-2-hydroxybenzene-1-carboxylic acid. | P, red-brown; S, red. |
| 3 | 42.0 | 4'-(3''-methyl-4''-aminobenzoylamino)-3-carboxy-4-hydroxydiphenyl urea. | Do. |
| 4 | 50.0 | 4'-(3''-methyl-4''-amonobenzoylamino)-5-sulpho-3-carboxy-4-hydroxydiphenyl urea. | Do. |

Example 4

1.0 part of the dyestuff obtained according to Example 1 is dissolved in a dyebath containing 3000 parts of water and 2 parts of soda. 100 parts of cotton are entered at 40–50°, the bath is heated to 90–95° within 30 minutes, 30 parts of sodium sulphate are added and dyeing is performed for 45 minutes at this temperature. After thoroughly rinsing the goods, the dyestuff is diazotised on the fibre for 15 minutes at 15° in a bath containing 3000 parts of water, 3 parts of sodium nitrite and 6 parts of hydrochloric acid 30%. The goods are then rinsed in cold water and treated for 20–30 minutes at 15° in a developing bath containing 3000 parts of water, 1 part of 2-hydroxynaphthalene and 0.26 part of caustic soda. The goods are then rinsed and dried in the usual way.

What we claim is:

1. A monoazo dyestuff which corresponds to the formula

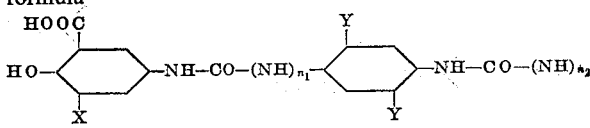

wherein X represents a member selected from the group consisting of H, Cl, $CH_3$, $OCH_3$ and $SO_3H$, Y represents a member selected from the group consisting of H and $CH_3$, each of $n_1$, $n_2$ and $n_3$ represents one of the numerals 0 and 1, A represents a radical selected from the group consisting of

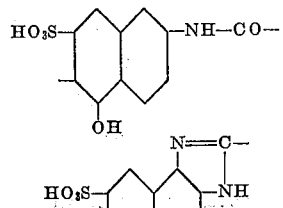

and

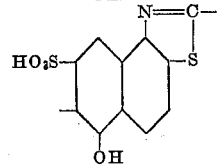

and Z represents a member selected from the group consisting of H, Cl and $CH_3$.

2. A monoazo dyestuff which corresponds to the formula

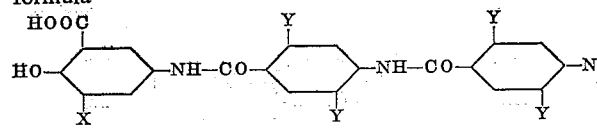

wherein X represents a member selected from the group consisting of H, Cl, $CH_3$, $OCH_3$ and $SO_3H$, Y represents a member selected from the group consisting of H and $CH_3$, A represents a radical selected from the group consisting of

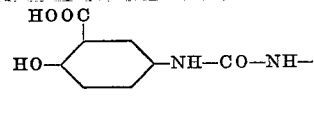

and

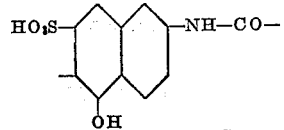

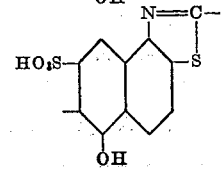

$n_3$ represents one of the numerals 0 and 1, and Z represents a member selected from the group consisting of H, Cl and $CH_3$.

3. A monoazo dyestuff which corresponds to the formula

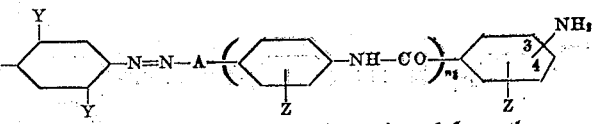

wherein X represents a member selected from the group consisting of H, Cl, $CH_3$, $OCH_3$ and $SO_3H$, Y represents a member selected from the group consisting of H and $CH_3$, A represents a radical selected from the group consisting of

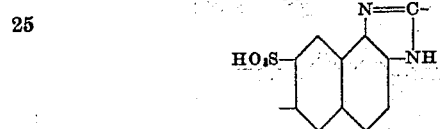

and

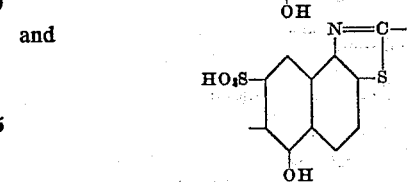

$n_3$ represents one of the numerals 0 and 1, and Z represents a member selected from the group consisting of H, Cl and $CH_3$.

4. A monoazo dyestuff which corresponds to the formula

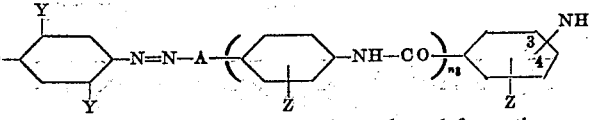

wherein X represents a member selected from the group consisting of H, Cl, $CH_3$, $OCH_3$ and $SO_3H$, Y represents a member selected from the group consisting of H and $CH_3$, A represents a radical selected from the group consisting of

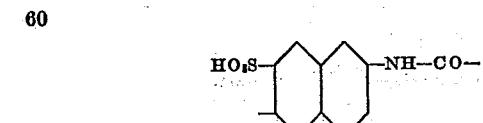

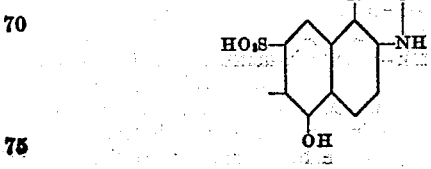

and

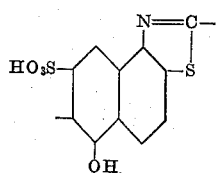

$n_3$ represents one of the numerals 0 and 1, and Z represents a member selected from the group consisting of H, Cl and CH₃.

5. A monoazo dyestuff having the formula:

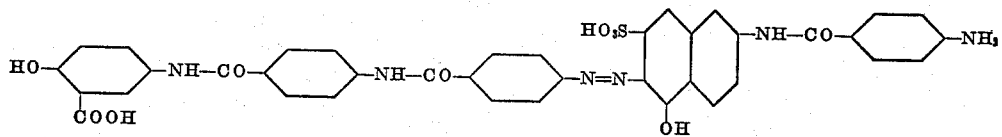

6. A monoazo dyestuff having the formula:

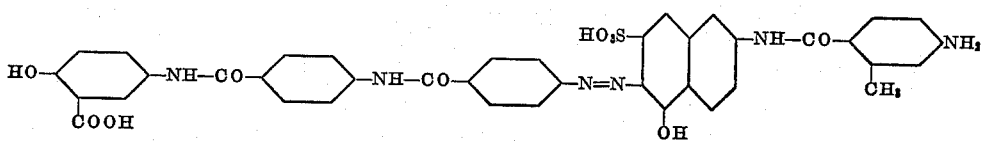

7. A monoazo dyestuff having the formula:

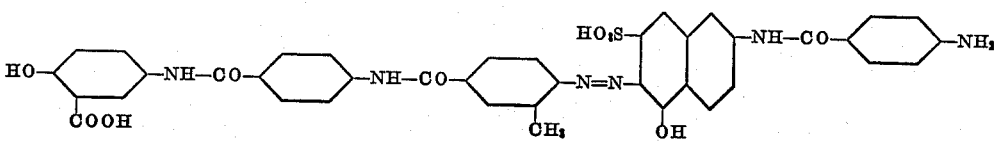

8. A monoazo dyestuff having the formula:

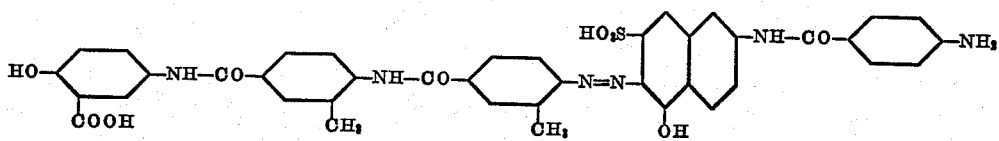

9. A monoazo dyestuff having the formula:

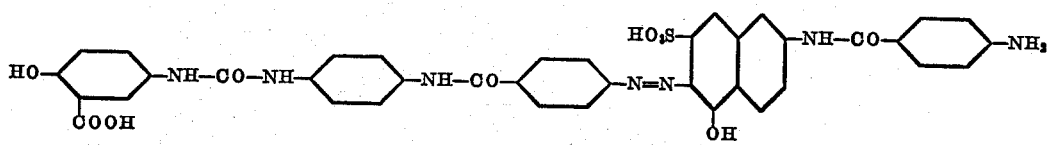

References Cited in the file of this patent
UNITED STATES PATENTS

| | | |
|---|---|---|
| 2,232,870 | Roos | Feb. 25, 1941 |
| 2,263,559 | Kirst | Nov. 25, 1941 |
| 2,381,599 | Krebser et al. | Aug. 7, 1945 |
| 2,418,624 | Chechak et al. | Apr. 8, 1947 |